United States Patent [19]

Chikazawa et al.

[11] Patent Number: 5,715,232
[45] Date of Patent: Feb. 3, 1998

[54] RECORDING AND REPRODUCTION OF ITEMS OF INFORMATION USING ROM-RAM STORAGE MEDIA

[75] Inventors: Yoshiharu Chikazawa, Tokyo; Akira Kawamura, Hachiouji, both of Japan; Yasuaki Morimoto, VS-Villingen, Germany; Friedhelm Zucker, VS-Villingen, Germany; Christian Büchler, VS-Villingen, Germany

[73] Assignee: Deutsche Thomson Brandt GmbH, Villingen Schwenningen, Germany

[21] Appl. No.: 699,514

[22] Filed: Nov. 27, 1995

Related U.S. Application Data

[63] Continuation of Ser. No. 376,634, Jan. 23, 1995, abandoned, which is a continuation of Ser. No. 81,041, Jun. 22, 1993, abandoned.

[30] Foreign Application Priority Data

Jun. 23, 1992 [DE] Germany .................. 42 20 486.0

[51] Int. Cl.⁶ ............................................. G11B 7/24
[52] U.S. Cl. ............................................. 369/275.2
[58] Field of Search ...................... 369/13, 112, 47, 369/32, 275.1–275.4

[56] References Cited

U.S. PATENT DOCUMENTS

| | | | |
|---|---|---|---|
| 4,392,219 | 7/1983 | Yokozawa et al. | 369/44.13 |
| 4,417,290 | 11/1983 | Tanaka et al. | 360/131 |
| 4,769,802 | 9/1988 | Tabuduguchi | 369/275.3 |
| 5,014,253 | 5/1991 | Morimoto et al. | 369/13 |
| 5,031,162 | 7/1991 | Morimoto et al. | 369/13 |
| 5,138,598 | 8/1992 | Sako et al. | 369/275.3 |
| 5,150,339 | 9/1992 | Ueda et al. | 369/275.2 |
| 5,204,852 | 4/1993 | Nakagawa et al. | 369/275.1 |
| 5,218,599 | 6/1993 | Tsuyoshi et al. | 369/13 |
| 5,241,531 | 8/1993 | Ohno et al. | 369/275.2 |
| 5,247,494 | 9/1993 | Ohno et al. | 369/47 |

FOREIGN PATENT DOCUMENTS

| | | |
|---|---|---|
| 3329217 | 2/1987 | Germany . |
| 2-281437 | 11/1990 | Japan . |
| 3-19148 | 1/1991 | Japan . |

*Primary Examiner*—Nabil Hindi
*Attorney, Agent, or Firm*—Joseph S. Tripoli; Eric P. Herrmann; Ronald H. Kurdyla

[57] ABSTRACT

A magneto optical disc system includes a disc having permanently recorded tracks overlain with magneto optical recording material. Data is recorded in the magneto optical material in tracks superimposed over the permanently recorded tracks, using the read-only data to define magneto optical tracks. The magneto optically recorded data is correlated with the prerecorded data for defining the location of data stored in the magneto-optic tracks.

4 Claims, 3 Drawing Sheets

RECORDING AND REPRODUCTION OF ITEMS OF INFORMATION USING ROM-RAM STORAGE MEDIA

This is a continuation of application Ser. No. 08/376,634, filed Jan. 23, 1995, now abandoned which is a continuation of application Ser. No. 08/081,041, filed Jun. 22, 1993, now abandoned.

BACKGROUND OF THE INVENTION

The present invention concerns a method for increasing storage capacity of storage systems containing both read only memory (ROM) and read-write memory (RAM) and a device for recording and reproducing data utilizing a ROM-RAM storage medium through use of coinciding RAM and ROM information tracks.

DESCRIPTION OF THE PRIOR ART

Optical, magnetic, and magneto optic storage systems are used for recording and reproduction of items of information. Optical storage systems, such as compact discs (CD), have depressions or pits in a spiral track that represent the items of information or data items stored on the CD. These depressions are implanted on or in the CD resulting in permanent stores or read-only memories. Reproduction of this stored information is accomplished by accelerating the CD and scanning it with a light beam. The CD is accelerated to a rotational speed determined by data signal contained in the information signal read from the CD. The CD is scanned at a higher rotational speed closer to its center axis than at the outer periphery to ensure a virtually constant reading speed despite the spiral shape of the information track.

Magnetic storage systems, generally known as audio or video tapes, are selectable as recording or reproducing devices. These systems store information on either magnetic tape or magnetic disc. Magnetic tape is moved at a virtually constant speed past a recording or reproduction head. The magnetic disc, such as is used for computers, inserts data items in predetermined sectors of respective discs.

A magneto optic disc (MOD) has a magnetic layer beneath a transparent layer in which data can be stored and from which data can be read out. (Described in the article "Magnetooptische Versuche dauern an" ["Optomagnetic testing continues"] on pages 37 to 41 of Funkschau 13, 21 (June 1986)). A MOD can be erased and rerecorded almost as often as desired by use of a magneto optic recording process. The items of information are stored in domains having different directions or magnetization and are read by use of polarized light. Correlation between the recording or reproduction of items of information and the rotational speed of the optical disc is achieved using a method and device in which the spiral information track is wobbled during recording of information in a direction running orthogonally thereto in synchronism with synchronization signals which are disposed in the train of information at regular time intervals. C.f. U.S. Pat. No. 4,392,219. The spiral information track thereby appears as a wavy line and in this respect exhibits a substantial difference to the information track of the CD. The wobbling of the information track is necessary in particular for regulating the rotational speed of the optical disc during the recording of data. However, due to the wobble frequency, increased demands are made on the scanning or reproduction system guiding the light or laser beam. The recording as well as the reproduction is thereby adversely influenced.

An optical scanning device may achieve an exact tracking by using a simple tracking control loop despite the wobbling information tracks on the record carrier. This optical scanning device is characterized by spacing between the diffraction beams of +1 and −1 order, which generates a tracking error signal, on the record carrier. This amounts to a whole number multiple of the center frequency wavelength with which the data tracks are wobbled about their central position. The reader is invited to read published German patent application DE-OS 39 23 330 A1 for additional information regarding this subject.

Utilizing this method requires apparatus for generating the wobble signal; decoding and eliminating the wobble signal during reproduction; and controlling the reproduction after the reproduction position has been located through use of synchronization signals all of which require storage space.

An optical record transparent layer representing a combination of a CD and a MOD (referred to as a RO/AM disc or ROM-RAM storage medium) has also been developed in the endeavor to increase the storage capacity of the information carrier. Items of information or data items are stored in pits or depressions (as found on a CD) while other items of information are stored and/or erased by magnetization of a light reflecting magnetic layer (as found in a MOD). This method increases the storage capacity by at least a factor of 2. The RO/AM disc can be both recorded and read in an advantageous manner by an optical scanning device as described in U.S. Pat. No. 5,014,253 which is incorporated herein by reference.

SUMMARY OF THE INVENTION

The present invention aims to increase the usable storage capacity of a ROM-RAM storage medium despite different recording and reproduction processes to one more than the capacity attainable from the sum of the different processes. Additionally, this invention seeks to avoid the disadvantages caused by wobbling the RAM information track and thereby simultaneously reduce cost.

This object is achieved by a method and a device in which items of information read out from the ROM region of the ROM-RAM storage medium are utilized for recording items of information into the RAM region of the ROM-RAM storage medium and reproducing items of information already stored. Items of information are extracted from the ROM region of the ROM-RAM storage medium to determine the position of items of information in the RAM and the correlation between the recording or reproduction and the record carrier. This function is implemented by a device which records and reproduces items of information by including, on the ROM-RAM storage medium, a RAM information track having a course coinciding with the ROM information track. As a result, the RAM information track is overlaid by the ROM information track and, in contrast to a wobbled information track, does not have any deviation or wobble running orthogonally to the direction of the track. Further, the recording and reproduction of items of information is possible since data items present in the ROM region of the ROM-RAM storage medium, preferably read out during the recording, are used in an advantageous manner instead of using a wobble signal to control rotational speed of the record carrier and locate the position of the recording. To this end, the methods and devices known about the reproduction, coding, and synchronization of ROM storage media are used. In addition, the data items present in the ROM region are also used for the reproduction of the items of information stored in the RAM region.

RAM and ROM items of information can be reproduced by utilizing only one scanning device. This allows data items normally used for determining position and synchronization in the RAM region to be eliminated. As a result, the usable storage capacity is increased over the sum of the storage capacities of the combined stores. Additionally, the expense required for the recording and reproduction device is reduced since the apparatus needed for conventionally decoding the wobble signal in a MOD is not necessary. The ROM region contains control as well as user data items and the RAM region contains user storage areas which overlie the user data items written in the ROM region.

A magneto optic disc, which has both pit structures as well as magnetic domains, such as a RO/AM disc, is suitable as the ROM-RAM storage medium; however, the usage is not limited to such types of record carrier.

DETAILED DESCRIPTION

Figure 1:
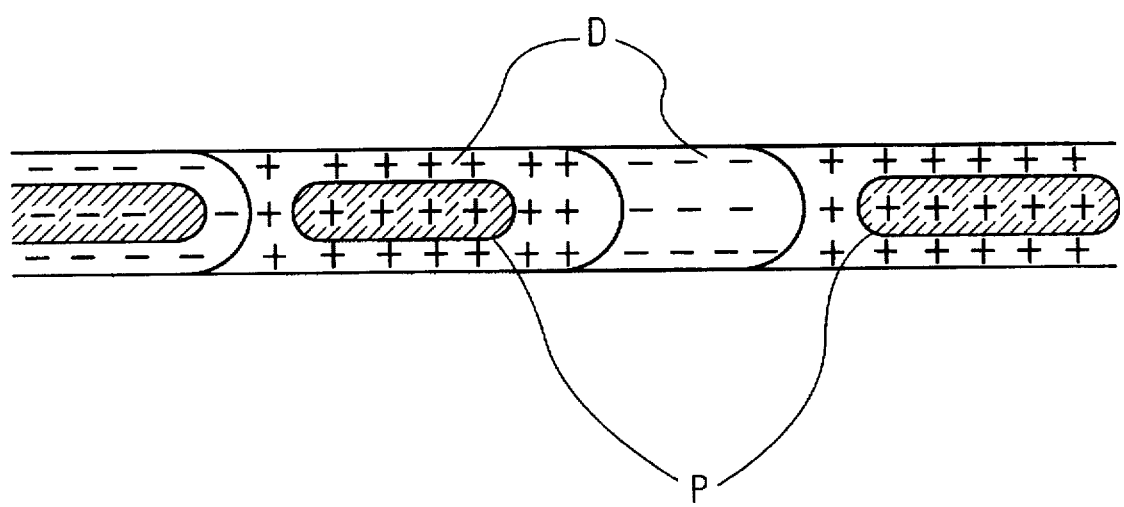
FIG. 1 shows an information track of a ROM-RAM storage medium.

For the recording and reproduction of items of information, a record carrier M, which is a ROM-RAM storage medium formed by a magneto optic disc, is used. The record carrier, M, is an information carrier as shown in FIG. 1, and has both pits P, of the type recorded on a CD, and magnetic domains D of the type utilized on a MOD. Contrary to standard practice, the magnetic domains D are arranged in the direction coinciding with the information track of the pits P. That is the track defining the magnetic domains does not wobble in the radial direction. To record items of information despite the non-wobbled RAM information track formed, the data items present in the ROM region of the ROM-RAM storage medium or in the ROM information track of the record carrier are used to locate the recording and/or playback locations. In addition, the ROM data is used for controlling the disc rotational speed and the speed of advance of the recording head relative to the record carrier.

The RAM information track can be selectively, at least in part, freed of data required for determining data location and synchronization, so that, by comparison, additional storage capacity is made available. In some systems it may be desirable to include data in the RAM storage region for self synchronization required during the reproduction of the RAM signal.

Figure 2:
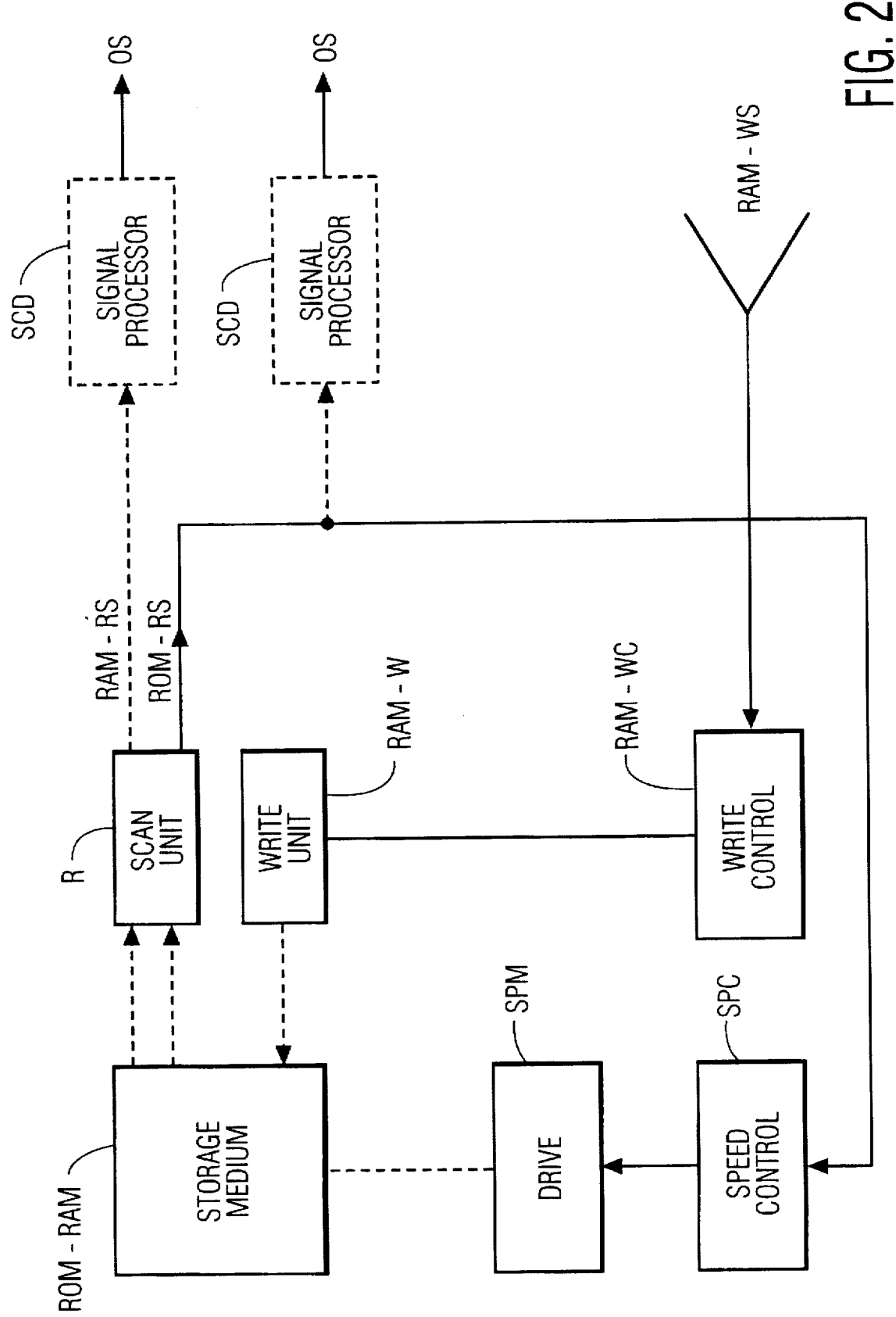
FIG. 2 is a block circuit diagram of a recording and reproduction device

FIG. 2 illustrates a block diagram of cost reduced apparatus for recording and playback of ROM-RAM discs according to the invention. The ROM-RAM storage medium or the record carrier M is driven by a drive mechanism SPM that is controlled by a speed control device SPC. The control signal for the speed control device SPC is derived exclusively from a ROM signal ROM-RS that is detected from the record carrier M by a scanning unit R. The scanning unit R makes both the detected ROM signal ROM-RS and the detected RAM signal RAM-RS available. These signals are then respectively supplied if required to other systems OS through respective signal processing stages SCD.

An item of information to be recorded on the record carrier M (a write signal RAM-WS) is transmitted by a write control unit RAM-WC and a write unit RAM-W to the record carrier M. Control data present in the ROM region of the record carrier M, which is formed as a ROM-RAM storage medium, are used to identify and locate the write signal RAM-WS. As a result, expensive speed regulation circuitry common to MOD recording and reproduction devices is no longer required. Therefore, costs may be substantially reduced. This is possible because, in particular, data items may be simultaneously read from the record carrier during the RAM recording. The permanently available ROM signal ROM-RS is used for controlling rotational speed of the record carrier M and the current position of scanning unit R relative to record carrier M, in known manner, from the ROM signal ROM-RS.

Recording and reproduction of items of information will be explained with the aid of a basic sketch of an appropriate device illustrated in FIG. 3. To record items of information on the ROM-RAM storage medium in the form of a magneto optic disc, data (write signal RAM-WS) is supplied to a coil W. The coil, in response to the write signal, generates a magnetic field that influences the magnetization direction of the domains D that are disposed in the magnetic layer of the record. More particularly, the record area to be recorded is first heated above its Curie temperature by a laser spot produced by a laser diode LD. This area is then subjected to a magnetic field produced by the coil W. The direction of magnetization induced in the MOD layer is determined by the field produced by coil W. Once the field is modified, the heated area is allowed to cool below its Curie temperature. This results in the storage or retention of the induced direction of magnetization.

For heating the magnetic layer, the laser diode LD is controlled by a laser driver LDD and a system controller SC. The temperature necessary for heating the magnetic layer is produced at the focal point of the laser beam on the record carrier M by a collimating lens CL and an objective lens OL. A ROM signal controls the rotational speed during recording and determines the position of the recording. The ROM signal is read from the record carrier M during recording and is detected by a photo diode PD3. The laser or light beam generated by laser diode LD is variably reflected by the pits P arranged on the record carrier M. A first polarization beam splitter PBS1, a second convex lens CV2, and a beam splitter HM are arranged in the beam path of the laser beam. The ROM signal ROM-RS is detected by the photo diode PD3 and processed by a current-voltage converter A1 into the actual ROM signal ROM-RS-1 or an information signal (which may be further processed).

This ROM signal ROM-RS-1 contains information regarding the current position and rotational speed of the record carrier. This signal is supplied by a switch S1 to a speed control device SPC. The speed control device applies the control voltage necessary for the required rotational speed of the record carrier M to the turntable motor SPM. Following this, the ROM signal ROM-RS-1, detected from the record carrier M, is used to record data on the ROM-RAM storage medium or record carrier M. In this operational mode, switch S2 is preferably open. Further, data stored in the ROM track of the record carrier M may be reproduced during the recording for appropriate additional processing of ROM signal ROM-RS-1, despite the superimposition of the RAM and ROM information tracks.

Additional influencing of the RAM signal RAM-WS is not required; therefore, disadvantages associated therewith may not arise. Moreover, the otherwise usual expense for control of the record carrier M when recording a RAM signal RAM-WS may be avoided since the ROM signal or data stored in the pits P may be used to accomplish this control. As a result, the RAM signal RAM-WS need not include speed control and position location information regarding the RAM storage. Additional storage space is thereby available.

Several modes of operation are possible for reproducing data recorded on a ROM-RAM storage medium. If data stored in the pits P or in the ROM region is to be exclusively reproduced, the manner previously described may be used. The laser beam or the laser diode LD is controlled such that the magnetic layer is not heated. This prevents destruction of data which may have been stored in the RAM region.

To exclusively reproduce items of information stored in the RAM region or in the magnetic domains D, polarized light is used in known manner. A first $\lambda/2$ plate P1 is arranged in the beam path of the laser beam, between the collimator lens CL and the first polarization beam splitter PBS1. The laser beam path is then directed to a second polarization beam splitter PBS2, arranged between the first polarization beam splitter PBS1 and a second convex lens CV2. From the second polarization beam splitter PBS2, the laser beam is deflected to a second $\lambda/2$ plate P2 and then a third polarization beam splitter PBS3. The third polarization beam splitter PBS3 splits the laser beam into two paths. One laser beam path is deflected to first convex lens CV1 and a photo diode, PD1. The other laser beam path is directed to a third convex lens CV3 and a photo diode PD2.

Each photo diode will receive more or less light depending on the reflected light. The differences in the electrical output received by photo diode PD1 and photo diode PD2 are used to recreate the RAM signal as read from the record carrier M. In this operating mode, switch S2 is closed and the record carrier M is controlled with the ROM signal ROM-RS-2. ROM-RS-2 is then coupled to the laser driver LDD and laser diode LD and supplied by the first switch S1 to speed control device SPC. Additionally signal ROM-RS-2 is made available at a corresponding terminal ROM-RS-2 for reproduction of the ROM data in parallel with the RAM signal. In this operating mode, the laser driver LDD or laser diode LD is controlled by a regulating signal detected, through a servo amplifier A2, switch S2, capacitor C1, and current-voltage converter A1, by a photo diode PD3. The capacitor C1 is incorporated to isolate the DC component of the regulating signal.

Figure 3:
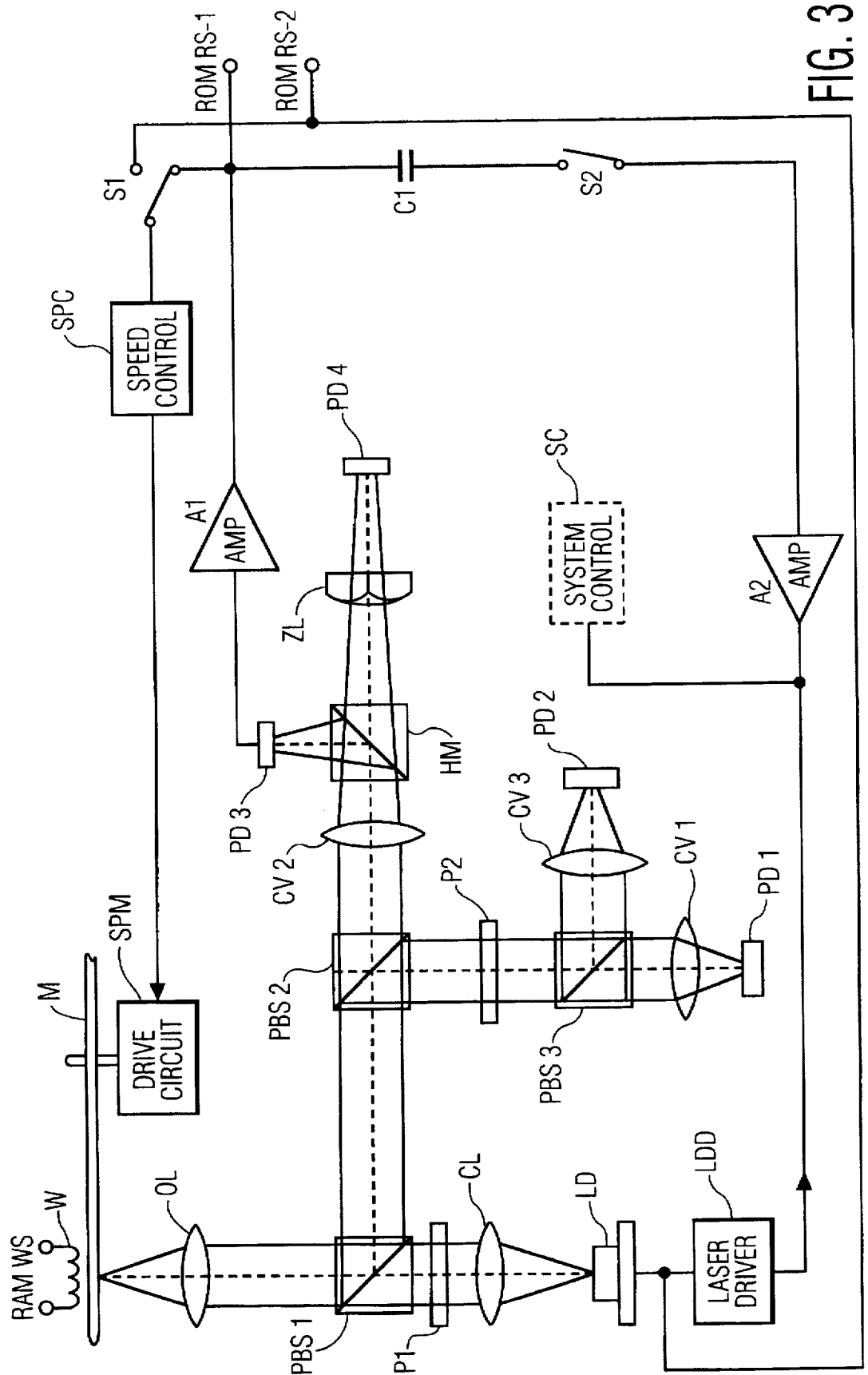
FIG. 3 is a basic sketch of a device for the recording and reproduction of items of information.

A cylindrical lens ZL and a photo diode PD4, shown in FIG. 3, track and focus the scanning beam.

Although the method and device for recording and reproducing data have only been described based on a ROM-RAM storage medium in the form of a magneto optic disc having a spiral information track exhibiting both pits P and magnetic domains D, the application is not limited to this type of record carrier.

What is claimed is:

1. In a ROM-RAM storage medium including a ROM region of pre-recorded tracks and a RAM region overlaying said ROM region, said pre-recorded tracks including data items usable to locate the position of recorded data therein, a method for storing data in said RAM region to increase the storage capacity of said RAM-ROM storage medium comprising:

applying a coherent light spot on one of said pre-recorded tracks, of intensity sufficient to record data in said RAM region, and detecting reflected light from said track for generating a tracking signal to control the position of said light spot;

detecting variations in said reflected light from respective pre-recorded ROM tracks, for detecting said data items in said pre-recorded ROM tracks to identify track positions in corresponding superimposed RAM tracks; and recording RAM data, exclusive of tracking and position information, at track positions in said corresponding superimposed RAM tracks identified via said data items detected in a currently detected ROM track.

2. In a ROM-RAM storage medium that includes a RAM region for recording and reproducing data superimposed over a ROM region containing data pre-recorded in tracks, a method comprising:

a. reading data items contained in currently scanned tracks in the ROM region of the ROM-RAM storage medium to locate track positions and recording items of information in the RAM region at located said track positions in respective RAM tracks superimposed on said currently scanned tracks in the ROM region, wherein information recorded in said RAM tracks is absent any tracking or position information; and b. reading data items contained in currently scanned tracks in the ROM region of the ROM-RAM storage medium to locate track positions, and reproducing items of information stored at located said track positions in respective RAM tracks superimposed over the currently scanned tracks in the ROM region of the ROM-RAM storage medium.

3. A device for the recording and reproduction of items of information comprising:

a ROM-RAM storage medium including a ROM area overlain with a magneto-optic recordable RAM area, said ROM area having pre-recorded tracks with data items recorded therein usable for locating positions of specific recorded information, and said RAM area including recordable RAM tracks superposed on said pre-recorded tracks;

apparatus for scanning respective pre-recorded tracks of the ROM area for tracking respective superposed RAM tracks;

apparatus for scanning respective pre-recorded tracks of the ROM area to detect said data items for concurrently determining locations of specific RAM data in a RAM track superimposed over; and apparatus for storing specific RAM data in respective superposed RAM tracks at specific positions as a function of the data items, and wherein recorded data in said RAM tracks is absent tracking or position information.

4. In a ROM-RAM storage medium including a ROM region of pre-recorded non-wobbled ROM tracks and a RAM region absent physical tracking structure, overlaying said ROM region, and wherein said pre-recorded ROM tracks include data items for locating specific data on said pre-recorded ROM tracks, a method for increasing the storage capacity of said ROM-RAM storage medium by storing data in said RAM region comprising:

applying a coherent light spot, of intensity sufficient to record data in said RAM region, on one of said pre-recorded non-wobbled ROM tracks, and detecting reflected light from said track for generating a tracking signal to control the position of said light spot;

detecting variations in said reflected light from respective pre-recorded non-wobbled ROM tracks, for detecting said data items in the pre-recorded ROM region to concurrently locate track positions in RAM tracks superposed over a currently scanned pre-recorded non-wobbled ROM track; and recording RAM data in a RAM track superimposed directly over said currently scanned pre-recorded ROM track, wherein the positions of respective recorded RAM data are located and associated with said data items in the pre-recorded ROM region, and said RAM data is exclusive of tracking or position information.

* * * * *